(12) United States Patent
Long (10) Patent No.: US 10,745,099 B2
(45) Date of Patent: *Aug. 18, 2020

(54) CONDUCTOR IN COMPOSITE

(71) Applicant: Wisk Aero LLC, Mountain View, CA (US)

(72) Inventor: Geoffrey Alan Long, Montara, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,283

(22) Filed: Aug. 31, 2017

(65) Prior Publication Data

US 2019/0061901 A1    Feb. 28, 2019

(51) Int. Cl.
| | |
|---|---|
| *B64C 1/12* | (2006.01) |
| *H05B 3/36* | (2006.01) |
| *H05B 6/36* | (2006.01) |
| *B32B 5/02* | (2006.01) |
| *B32B 15/14* | (2006.01) |
| *B32B 5/12* | (2006.01) |

(52) U.S. Cl.
CPC ............... *B64C 1/12* (2013.01); *H05B 3/36* (2013.01); *H05B 6/362* (2013.01); *B32B 5/024* (2013.01); *B32B 5/12* (2013.01); *B32B 15/14* (2013.01); *B32B 2250/40* (2013.01); *B32B 2307/558* (2013.01); *B32B 2307/718* (2013.01); *B32B 2605/18* (2013.01)

(58) Field of Classification Search
CPC .................................................... B64C 1/12
See application file for complete search history.

(56) References Cited

U.S. PATENT DOCUMENTS

| | | | | | |
|---|---|---|---|---|---|
| 3,089,666 | A | * | 5/1963 | Quenzler | ............ B64C 29/0033 244/7 R |
| 4,875,644 | A | * | 10/1989 | Adams | ................. B64D 15/163 244/134 D |
| 5,098,037 | A | * | 3/1992 | Leffel | ................. B64D 15/166 244/134 A |
| 5,129,598 | A | * | 7/1992 | Adams | ................. B64D 15/163 244/134 A |
| 8,128,030 | B2 | * | 3/2012 | Dannenberg | .............. B64C 1/12 244/119 |
| 9,643,720 | B2 | * | 5/2017 | Hesselbarth | ........ B64C 29/0033 |
| 10,364,024 | B2 | * | 7/2019 | Tighe | ...................... B64C 27/08 |

(Continued)

OTHER PUBLICATIONS

PCT/US2018/038723, "International Preliminary Report on Patentability", dated Mar. 12, 2020, 12 pages.

*Primary Examiner* — Monique R Jackson
(74) *Attorney, Agent, or Firm* — Kilpatrick Townsend & Stockton LLP (57) ABSTRACT

A conductor in composite is disclosed. In various embodiments, an electrically conductive structure, such as an electrically conductive metal, is sandwiched between insulating material and two or more layers of fiber reinforced composite material, to form a stack that is used to form a composite structure that includes the electrically conductive layer. The layer may comprise an electrical line, trace, bus, etc. to conduct electricity from one location to another within the composite structure, such as to connect a battery or other power source at one location to an electrical load at another location.

19 Claims, 5 Drawing Sheets

(56) References Cited

U.S. PATENT DOCUMENTS

| | | | | |
|---|---|---|---|---|
| 10,364,036 B2* | 7/2019 | Tighe | ................... | B64D 29/02 |
| 2011/0052910 A1* | 3/2011 | Gunnink | ................ | B32B 15/14 |
| | | | | 428/337 |
| 2013/0020429 A1* | 1/2013 | Kroo | ....................... | B64C 3/16 |
| | | | | 244/6 |
| 2014/0070047 A1* | 3/2014 | Williams | ................. | B64C 1/12 |
| | | | | 244/17.11 |
| 2015/0344138 A1* | 12/2015 | Wen | ...................... | H05B 3/286 |
| | | | | 219/541 |

* cited by examiner

CONDUCTOR IN COMPOSITE

BACKGROUND OF THE INVENTION

Electric aircraft and other electric vehicles typically use onboard batteries to power electric motors coupled to lift fans, propellers, rotors, drive trains, etc. that propel aircraft or other vehicle. In configurations in which the batteries are located remotely from the motors, electric wires or cables are run from the batteries to the motors. The wire or cables must be of a sufficient size to support the electrical load, and the weight of the conductive material comprising the wires or cables and the insulation in which they typically are encapsulated may add significant weight to the overall aircraft or other vehicle, potentially adversely impacting performance, such as maximum speed, handling, battery life, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Composite structures comprising electrical current conductors are disclosed. In various embodiments, these conductors incorporated into composite structures, as disclosed herein, may be used to provide a conductive connection between electrical and/or electronic circuit elements, e.g., to complete a circuit or portion thereof. For example, in some embodiments, composite structures of an electric-powered aircraft or other vehicle may include one or more conductors to connect a battery in one location in the aircraft or other vehicle to the power electronics for a motor in another location remote from the battery. For example, in the case of an aircraft, the conductor in the composite may connect a battery located in a central location, such as the aircraft fuselage, to a motor or power electronics at a location remote from the fuselage, e.g., one mounted on or in a wing. In various embodiments, conductors incorporated into composite structures as disclosed herein may be insulated electrically from other conductive or potentially conductive structures comprising the composite, such as carbon fiber reinforced layers and/or other conductive structures.

Figure 1:
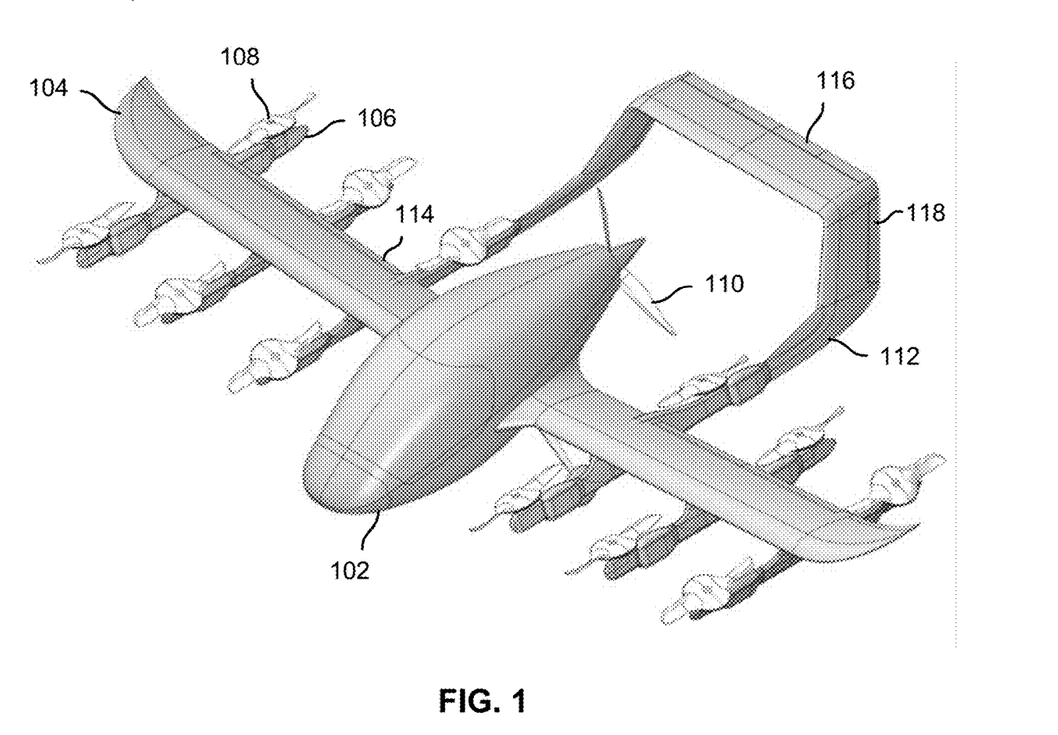
FIG. 1 is a block diagram illustrating an embodiment of a multicopter aircraft with angled rotors.

FIG. 1 is a block diagram illustrating an embodiment of a multicopter aircraft with angled rotors. In various embodiments, composites comprising conductors may be used in an electrically-power aircraft, such as aircraft 100 of FIG. 1. In the example shown, aircraft 100 includes a fuselage (body) 102 and wings 104. A set of three underwing booms 106 is provided under each wing 104. Each boom 106 has two lift fans 108 mounted thereon, one forward of the wing and one aft. Each lift fan 108 may be driven by an associated drive mechanism, such as a dedicated electric motor. One or more batteries (not shown) and/or onboard power generators (e.g., small gas turbine) may be used to drive the lift fans 108 and/or charge/recharge onboard batteries. In various embodiments, the battery(ies) may be housed in a cavity inside fuselage 102, e.g., just below or behind a cabin/seat configured to be occupied by one or more human occupants/operators. In various embodiments, electrical connections between the centrally-located battery(ies) and the respective motors associated with lift fans 108 are made at least in part via conductive structures incorporated into composite materials comprising one or more of the fuselage 102, associated wing 104, and associated boom 106. In some embodiments, conductive structures are incorporated into wing 104 and connection to such structures are made at the inboard end by wires or cable connecting the battery(ies) to the conductive structure and at the outboard (motor) end by wires connecting the conductive structure to the motor. In various embodiments, for each motor a first conductive structure connects a positive terminal of the battery to the corresponding terminal of the motor and a second conductive structure connects the other motor terminal to the common ground/negative terminal of the battery.

In the example shown in FIG. 1, a propeller 110 is mounted on the fuselage 102 and configured to push the aircraft through the air in the forward (e.g., x axis) direction. The propeller 110 is positioned between a pair of tail booms 112 that extend aft and are joined at their aft end by a tail structure on which aerodynamic control surfaces including elevators 116 and rudder 118 are mounted. In various embodiments, each of the inboard booms 106 forms at least in part an integral part of the corresponding port/starboard side tail boom 112. In some embodiments, the tail booms 112 comprise extensions aft from the respective inboard booms 106. For example, the tail booms 112 may be formed as part of or fastened (e.g., bolted) to an aft end of the corresponding inboard boom 106. Additional control surfaces include ailerons 114 mounted on the trailing edge of wings 104. In various embodiments, one or both of electrical power connections and control signal connections may be made to a motor associated with propeller 110 and/or servos or other actuators associated with control surfaces 114, 116, and 118 using conductive structures incorporated into composites as disclosed herein.

Figure 2:
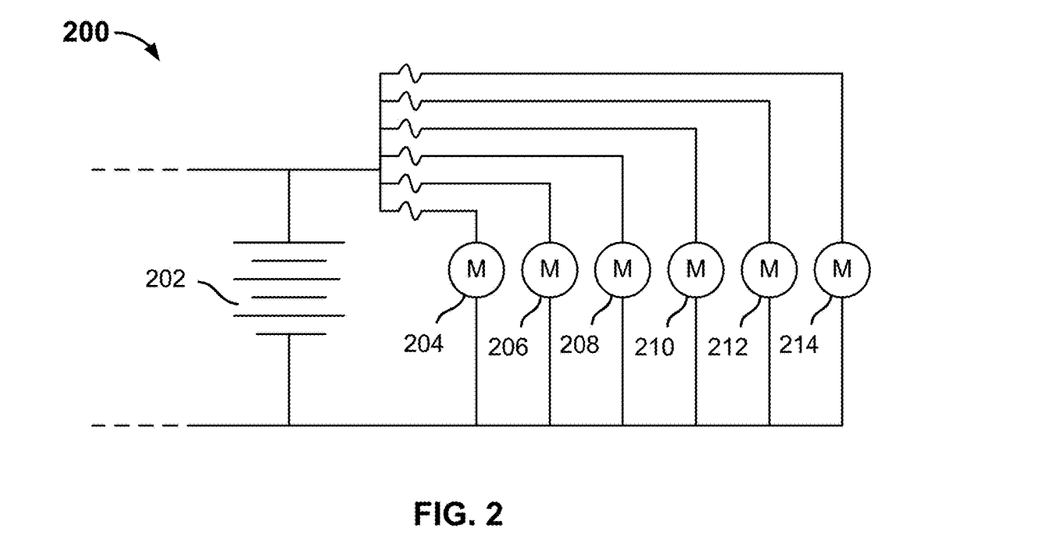
FIG. 2 is a schematic diagram illustrating an example of electrical connections made in various embodiments at least partly via conductive structures in a composite material.

FIG. 2 is a schematic diagram illustrating an example of electrical connections made in various embodiments at least partly via conductive structures in a composite material. In some embodiments, the circuit 200 of FIG. 2 is used to provide electrical power to motors collocated with lift fans 108 of the aircraft 100 of FIG. 1. Referring to FIG. 2, a centrally-located battery 202 (e.g., a battery housed in a portion of fuselage 102 of the aircraft 100 of FIG. 1) is connected electrically to each of a plurality of motors 204, 206, 208, 210, 212, and 214, representing motors associated with lift fans on one side or the other of an aircraft such as aircraft 100 of FIG. 1. For example, motors 204 and 206 may be associated with the fore and aft lift fans 108, respectively, on the inboard boom 106; motors 208 and 210 may be associated with the fore and aft lift fans 108, respectively, on the middle boom 106; and motors 212 and 214 may be associated with the fore and aft lift fans 108, respectively, on the outermost boom 106. In various embodiments, the electrical connections from battery 202 to the respective motors 204, 206, 208, 210, 212, and 214, and the return connections to the common ground, are made at least partly via conductors incorporated into a composite material, e.g., comprising a wing 104 of the aircraft 100 of FIG. 1, as disclosed herein. In some embodiments, the electrical connections are made at least partly via conductors incorporated into the composite material of some or all of the booms.

Figure 3A:
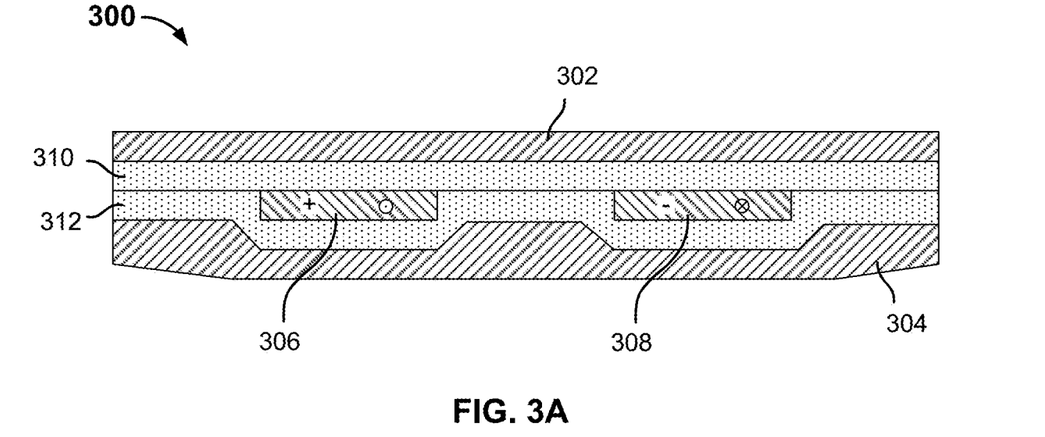
FIG. 3A is a diagram illustrating an embodiment of a composite material incorporating conductors.

FIG. 3A is a diagram illustrating an embodiment of a composite material incorporating conductors. In various embodiments, a structure as shown in FIG. 3A may be used to incorporate conductors in a composite material, such as a wing 104 of aircraft 100 of FIG. 1, to allow electrical connections to be made between remote structures, such as between battery 202 of FIG. 2 and motors 204, 206, 208, 210, 212, and 214.

In the example shown in FIG. 3A, a cross-sectional view of composite structure 300 is shown. As shown, the composite structure 300 includes an upper layer 302 and a bottom layer 304, each comprising one or more layers of composite material. In various embodiments, the composite material can be made from various fabrics such as carbon fiber, fiberglass cloth, Kevlar, nonwoven fiberglass, etc. as well as a resin such as epoxy, BMI, thermoplastic, etc. In various embodiments, at least some of the upper layer 302 or lower layer 304 are made from an electrically conductive composite material, such as carbon fiber reinforced composite. A first conductor 306 and a second conductor 308 sandwiched between electrically-insulative layers 310 and 312, e.g., fiberglass layers, are sandwiched between the upper and lower layers 302 and 304. In some embodiments, a structure as shown in FIG. 3A may be used to provide connection via the first conductor 306 between the positive terminal of a battery, such as battery 202 of FIG. 2, and a motor, such as one of the motors 204, 206, 208, 210, 212, and 214, and to provide connection via the second conductor 308 from the motor to the negative terminal of the battery. For each motor to which a connection is to be made via the structure 300, in various embodiments a corresponding pair of conductors like conductors 306 and 308 may be included in the composite structure.

In various embodiments, the conductors 306 and 308 may be located in a layer relatively near an outer surface of an aircraft or other structure comprising the composite structure 300, such as a wing 104 or a boom 106 of the aircraft 100 of FIG. 1. In some embodiments, locating the conductors 306 and 308 near the surface facilitates the transfer of heat from the conductors 306 and 308 to the ambient air, e.g., as air flows across the surfaces of the wing or other structure.

In various embodiments, the above heat transfer characteristic may be taken into consideration in selecting a design width and thickness of the conductors 306 and 308. In some embodiments, the conductors 306 and 308 may be required to conduct a high current to power associated motors, at least in certain modes of operation. For example, the lift fans 106 of FIG. 1 may be required to be driven by high current to generate high torque during takeoff and landing. In some embodiments, locating conductors 306 and 308 near the outer surface of an aircraft structure comprising composite structure 300 (e.g., a wing 104) enables conductors 306 and 308 to have a smaller cross-sectional area, resulting in the conductors 306 and 308 contributing less to the total weight of the aircraft or other vehicle.

In various embodiments, the conductors 306 and 308 are thin relative to their width. In some embodiments, the conductors 306 and 308 are formed from 0.020 inch thick aluminum sheet material, and may have a width determined to provide a conductor having sufficient cross-sectional area to support a required current flow, in light of the cooling provided by airflow over an associated structure, such as structure 300 of FIG. 3A and/or wing 104 of FIG. 1. In various embodiments, conductors 0.002 inch to 0.050 inch thick may be used. In some embodiments, conductors such as conductors 306 and 308 may be designed to carry current on the order of 50 amps. For example, in some embodiments, aluminum conductors cut from 0.020 in thick aluminum sheet are used, and conductors approximately 1 inch wide are used. In various embodiments, providing a relatively flat, thin conductor near the surface of a structure over which air flows in at least some modes of operation, such as structure 300 of FIG. 3A and/or wing 104 of FIG. 1, maximizes a surface area exposed to such cooling airflow and enable more current to be carried by a conductor having less cross-sectional area than would otherwise be required, thereby reducing overall aircraft/vehicle weight.

In some embodiments, conductors incorporated into composites, such as conductors 306 and 308 of FIG. 3A, comprise copper, aluminum and/or other lightweight conductors. In some embodiments, conductors incorporated into composites may be stamped or otherwise formed from 0.020 in thick (or other thickness) aluminum sheet material. The stamped or otherwise formed pieces may be bent or otherwise shaped to conform to the contours of the end product (e.g., wing 104) and laid up with other composite layers (e.g., layers 302, 304, 310, and 312 in the example shown in FIG. 3A), and may be cured using heat and/or pressure, as in conventional composite material fabrication processes.

Figure 3B:
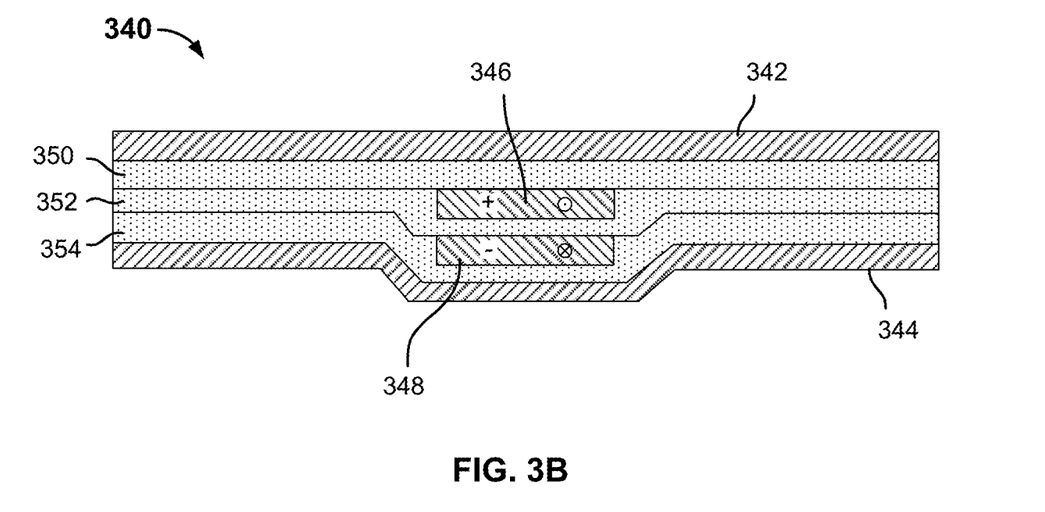
FIG. 3B is a diagram illustrating an embodiment of a composite material incorporating conductors.

FIG. 3B is a diagram illustrating an embodiment of a composite material incorporating conductors. In the example shown in FIG. 3B, the conductors (346, 348) are in an over/under position with respect to one another, as opposed to the side by side arrangement shown in FIG. 3A. Specifically, the composite structure 340 of FIG. 3B includes an upper layer 342 and a lower layer 344 comprising carbon fiber reinforced material. Conductors 346 and 348 are sandwiched between electrically-insulating layers 350, 352, and 354, e.g., fiberglass, which are in turn sandwiched between the carbon fiber reinforced layers 342, 344. In various embodiments, the over/under arrangement of conductors as shown in FIG. 3B may enable more pairs of conductors to be run through a narrower part or section thereof that may not be able to accommodate the required number of conductors in the side by side configuration. In various embodiments, this arrangement also has lower inductance and radiated electromagnetic emissions than that of FIG. 3A.

Figure 4A:
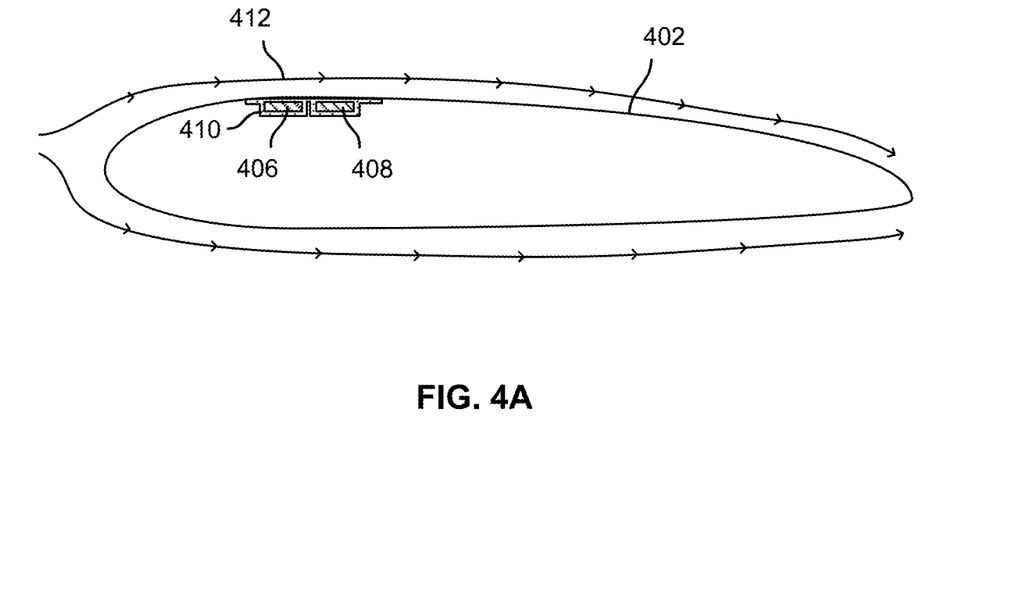
FIG. 4A is a diagram illustrating an embodiment of a composite airfoil comprising conductors.

FIG. 4A is a diagram illustrating an embodiment of a composite airfoil comprising conductors. In various embodiments, a structure as shown in FIG. 4A may comprise a wing or other aircraft structure, such as wing 104 of FIG. 1. In the example shown, airfoil 402 is shown in a cross-section view to comprise a multilayer composite structure that includes conductors 406 and 408 sandwiched within composite layers 410. In some embodiments, composite layers 410 may include insulating layers around conductors 406 and 408, such as insulating layers 310 and 312 of FIG. 3A, encapsulated in other composite layers, such as carbon fiber reinforced layers 302, 304 of FIG. 3A. As shown in FIG. 4A, airflow 412 around the upper and lower surfaces of airfoil 402 provides cooling to remove heat from conductors 406, 408, such as heat that may be generated by passing high current through conductors 406, 408 during at least certain flight operations, such as takeoff or landing of a vertical takeoff/landing (VTOL) aircraft, e.g., aircraft 100 of FIG. 1.

Figure 4B:
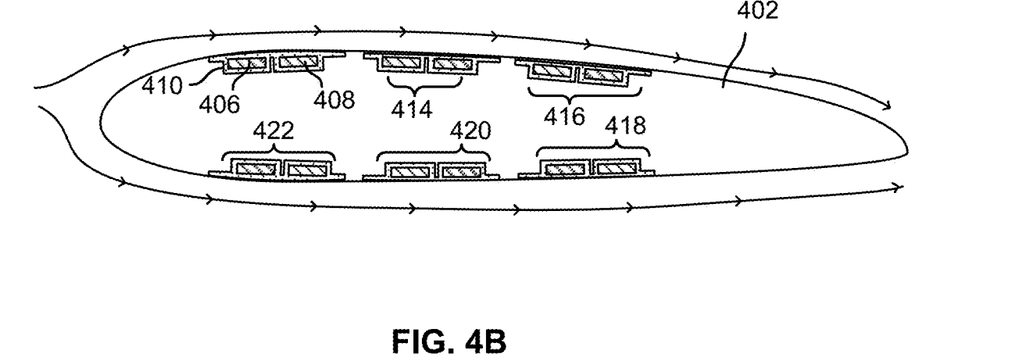
FIG. 4B is a diagram illustrating an embodiment of a composite airfoil comprising conductors.

FIG. 4B is a diagram illustrating an embodiment of a composite airfoil comprising conductors. In various embodiments, the structure illustrated in FIG. 4B may be used to provide an aircraft or other structure, such as a wing, that includes conductors to connect the positive and negative terminals of a centrally-located battery to a plurality of remote electric motors. For example, in some embodiments, the airfoil 402 of FIG. 4B may be used to connect a battery, such as battery 202 of FIG. 2, to each of six remote motors, such as motors 204, 206, 208, 210, 212, and 214 of FIG. 2. In some embodiments, the remote motors may each be associated with a corresponding lift fan, such as the lift fans 108 associated with one or the other of the wings 104 of aircraft 100 of FIG. 1.

In the example shown in FIG. 4B, the airfoil 402 includes, in addition to the pair of conductors 406 and 408 encapsulated in composite material layers 410, an additional five pairs of encapsulated conductors 414, 416, 418, 420, and 422, for a total of six pairs of conductors. In some embodiments, each pair of conductors may be disposed and connected to provide an electrical connection to the positive and negative terminals of a centrally-located battery. In some embodiments, conductors integrated into the upper composite structure of airfoil 402, including structures 406, 408, 410; 414; and 416, may be disposed and connected to provide electrical power to forward lift fans, such as the lift fans 108 shown forward of the wings 104 in FIG. 1, while the lower conductors 418, 420, and 422 are disposed and connected to provide electrical power to aft lift fans 108. In some embodiments, the fuses shown in FIG. 2 are connected between the battery and each of the positive conductors 406, providing short circuit protection. In this arrangement, a short in one of the circuits only affects that circuit and not the other 5 circuits. In some embodiments (not shown in FIG. 4B), all 6 circuits share a common negative conductor that is approximately 6 times the cross-sectional area of each of the positive conductors.

Figure 5A:
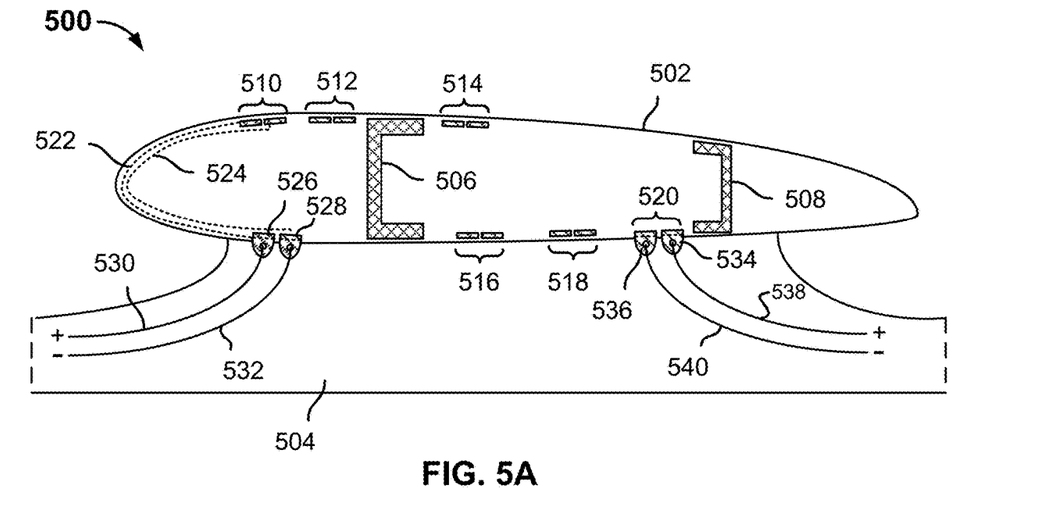
FIG. 5A is a diagram illustrating an embodiment of a composite airfoil comprising conductors and associated structures and connections.

FIG. 5A is a diagram illustrating an embodiment of a composite airfoil comprising conductors and associated structures and connections. In various embodiments, the structures and connections shown in FIG. 5A may be used to provide an electrical connection between a centrally-located battery and motors associated with lift fans mounted on an underwing boom, or similar structure, such as lift fans 108 mounted on booms 106 of the aircraft 100 of FIG. 1.

In the example illustrated in FIG. 5A, structure 500 is shown in cross-sectional view to include an airfoil 502, such as wing 104 of FIG. 1, and a boom 504, such as boom 106 of FIG. 1, mounted to an underside of airfoil 502. Airfoil 502 comprises a composite material, such as carbon fiber reinforced composite material. Longitudinal spars 506 and 508 (shown in cross-section) provide structural support and rigidity to airfoil 502. A plurality of conductor pairs 510, 512, 514, 516, 518, and 520 are shown to be incorporated in the composite structure of airfoil 502. In various embodiments, each conductor pair 510, 512, 514, 516, 518, and 520 may comprise the structure of FIG. 3A, e.g., two conductors sandwiched between insulating layers that insulate the conductors from each other and from adjacent composite layers, all encapsulated in one or more layers of carbon fiber reinforced or other composite material.

Referring further to FIG. 5A, the conductors comprising conductor pair 510 are shown to be connected electrically by conductive paths 522 and 524, respectively, to conductive tabs 526 and 528, respectively, on the front end of the underside of airfoil 502. In various embodiments, conductive paths 522 and 524 comprise continuations of the respective conductors comprising conductive pair 510, and are integrated into the composite structure of airfoil 502 in the same manner as the conductors comprising conductive pair 510. In some embodiments, the conductors comprising conductive pair 510 extend radially outward from an inboard (nearest the fuselage) end of airfoil 502 (e.g., an inboard end of a wing 104 in FIG. 4), then continue as conductive paths 522 and 524, respectively, bending or turning toward the leading edge of airfoil 502 and wrapping around and under the wing to the tabs 526 and 528. In various embodiments, the tabs 526 and 528 may be continuations of the same conductors comprising conductor pair 510 and conductive paths 522 and 524, or they may be separate structures to which conductive paths 522 and 524 are bonded conductively, e.g., by clamping, soldering, welding, conductive adhesive, etc. In the example shown, wires 530 and 532 are connected conductively to tabs 526 and 528, respectively, e.g., by a conductive metal fastener or other conductive materials. Wires 530 and 532 may extend and be connected to the terminals of a forward lift fan motor (not shown in FIG. 5A), such as a forward-mounted instance of lift fan 108 of FIG. 1.

Similarly, the conductors comprising conductor pair 520 are connected electrically to tabs 534 and 536, respectively. Tabs 534 and 536 are in turn connected electrically to wires 538 and 540, respectively, which may in various embodiments in turn be connected to the terminals of an aft lift fan motor (not shown in FIG. 5A), such as a aft-mounted instance of lift fan 108 of FIG. 1.

Figure 5B:
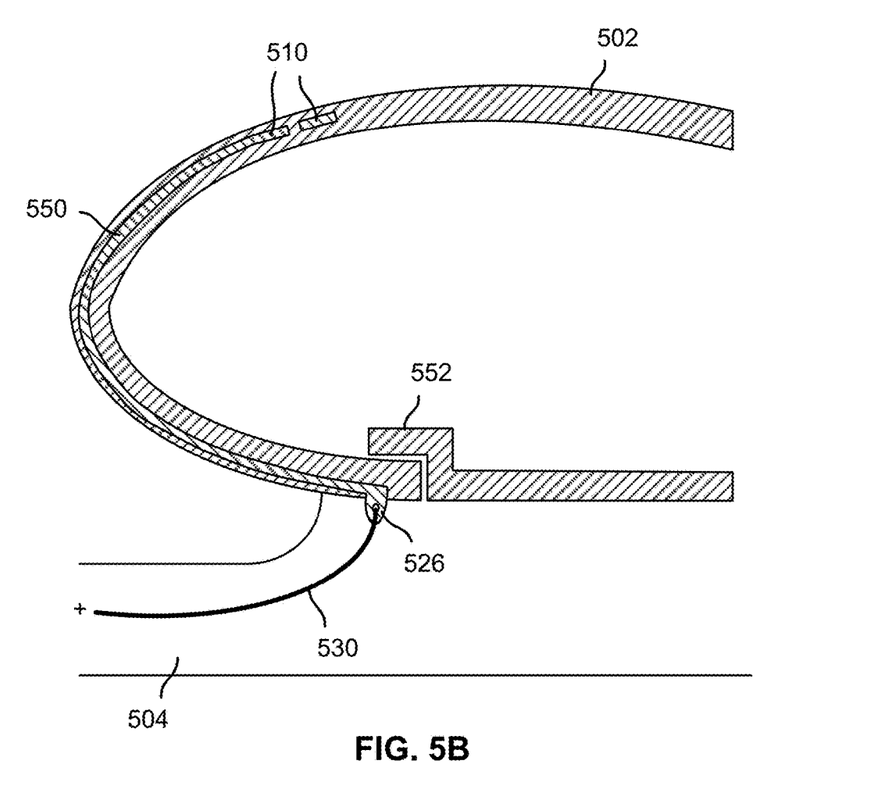
FIG. 5B is a diagram illustrating an embodiment of a composite airfoil comprising conductors and associated structures and connections.

FIG. 5B is a diagram illustrating an embodiment of a composite airfoil comprising conductors and associated structures and connections. FIG. 5B shows a detailed view of elements of the structure 500 of FIG. 5A as implemented in various embodiments. In the example shown, the composite structure of airfoil 502 is shown to incorporate conductors 510. The leftmost conductor is shown to be extended and/or connected electrically to a conductor 550 that wraps around the leading edge of the airfoil 502 to terminate at tab 526, which in turn is connected to wire 530. In some embodiments, the other conductor in pair 510 would continue out of the page, towards the viewer, and similarly be connected via a conductor that wraps around the leading edge of airfoil 502, to connect to tab 528 as shown in FIG. 5A.

In the example shown in FIG. 5B, the conductor 550 extends to tab 526, which extends through the outer layer of airfoil 502 to provide a location to enable wire 530 to be connected to tab 526. In this example, the composite comprising airfoil 502 includes a stepped joint in which an overlap portion 552 of the composite material comprising airfoil 502 overlaps an end portion of composite material comprising the leading edge of airfoil 502 to provide a strong and stiff structural joint between the upper and lower wing skins that seals out the elements (e.g., moisture) with minimal drag.

Figure 6:
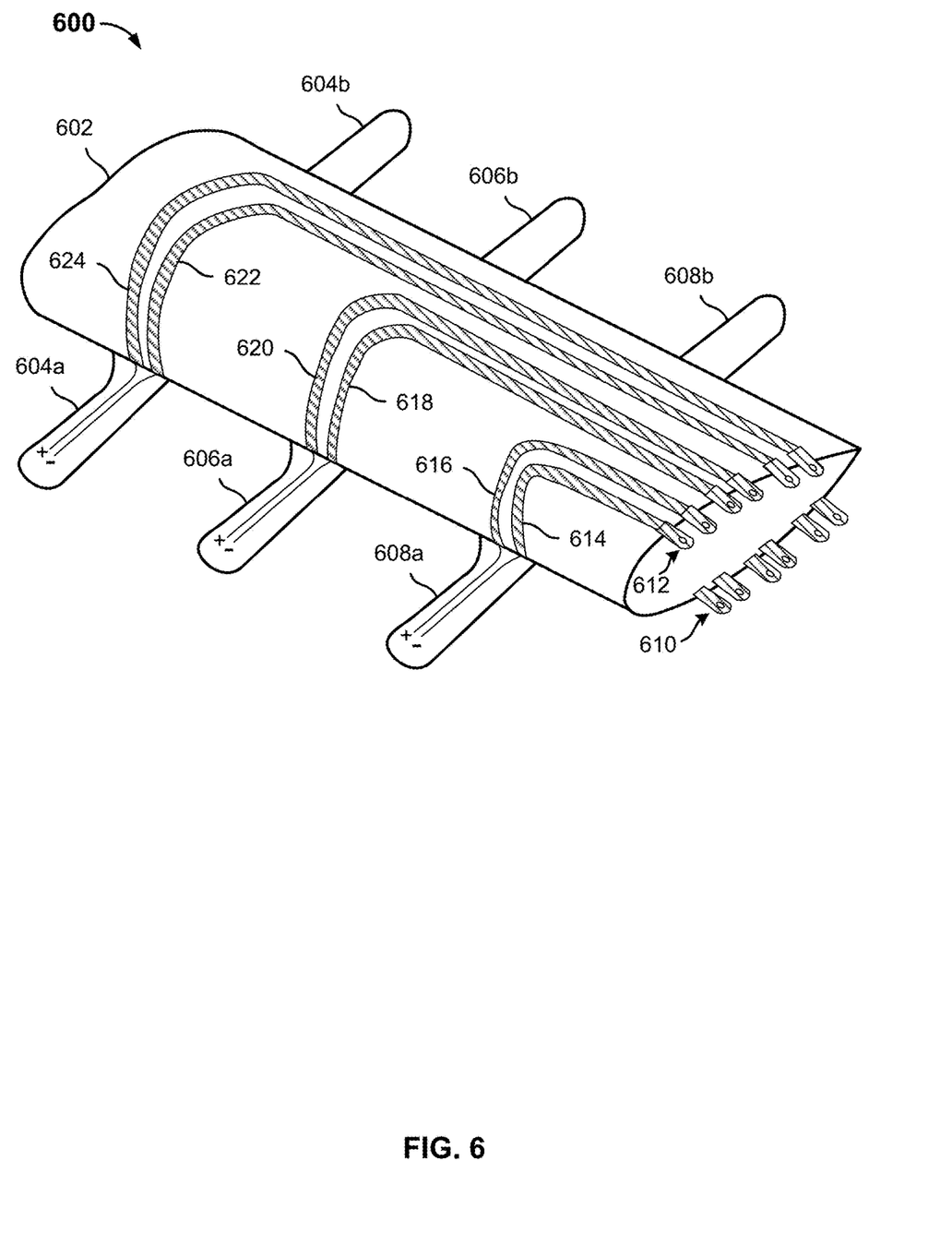
FIG. 6 is a diagram illustrating an embodiment of a composite airfoil comprising conductors and associated structures and connections.

FIG. 6 is a diagram illustrating an embodiment of a composite airfoil comprising conductors and associated structures and connections. In various embodiments, the wing 600 of FIG. 6 is used to provide wings 104 of FIG. 1, including the electrical connections required to connect a battery located in fuselage 102 of FIG. 1 to electric motors associated with lift fans 108. In the example shown, airfoil 602 comprises a composite structure to which composite booms 604a/b, 606a/b, and 608a/b have been attached, e.g., via fasteners. In this example, the designations "a" and "b" identify to forward-extending and aft-extending parts of the booms 604a/b, 606a/b, and 608a/b, respectively. Each of the booms 604a/b, 606a/b, and 608a/b corresponds to a boom 106 of the aircraft 100 of FIG. 1, in various embodiments.

In the example shown in FIG. 6, wing 600 includes a lower plurality of tabs 610 and an upper plurality of tabs 612. Each plurality of tabs 610, 612 includes in this example three pairs of tabs. Each pair of tabs comprising the lower plurality of tabs 610 is associated with providing electrical connection to the positive and negative terminals of a battery for a corresponding aft lift fan motor. Electrical connectivity is provided in various embodiments via lower conductive paths incorporated into a lower (underside) portion of the composite material comprising airfoil 602 (not shown in FIG. 6). Each pair of tabs comprising the upper plurality of tabs 612 is associated with providing electrical connection to the positive and negative terminals of a battery for a corresponding forward lift fan motor. Electrical connection to the respective motors is provided in this example by conductors 614, 616, 618, 620, 622, and 624, which in various embodiments are incorporated into the composite material structure of airfoil 602 as disclosed herein, e.g., as shown in FIG. 3A.

In the example shown, conductors 614 and 616 extend radially along the top surface of airfoil 602, then turn towards the leading edge of airfoil 602 and wrap around the front of the leading edge to allow electrical connection to be made via wires contained in the forward part 608a of the inboard boom 608a/b. Similarly, conductors 618 and 620 extend radially along the top surface of airfoil 602, then turn towards the leading edge of airfoil 602 and wrap around the front of the leading edge to allow electrical connection to be made via wires contained in the forward part 606a of the center boom 606a/b. Finally, conductors 622 and 624 extend radially along the top surface of airfoil 602, then turn towards the leading edge of airfoil 602 and wrap around the front of the leading edge to allow electrical connection to be made via wires contained in the forward part 604a of the outboard boom 604a/b. In various embodiments, the structures used to terminate the conductors 614, 616, 618, 620, 622, and 624, and to provide electrical connection to the corresponding lift fan motors are as shown in FIGS. 5A and 5B.

In various embodiments, conductors such as conductors 614, 616, 618, 620, 622, and 624, may be formed and integrated into a composite structure such as airfoil 602 at least in part by stamping or cutting (e.g., using a template) flat shapes corresponding to each conductor, e.g., from 0.020 inch thick aluminum sheet material; bending (e.g., using a mold, form, mandrel, and/or other tooling) the cut forms to the desired shape, e.g., to conform to the shape of the leading edge of airfoil 602 in the example shown in FIG. 6; and laying up the conductors in corresponding locations and in corresponding layers in a stack of layers (e.g., comprising pre-preg carbon fiber reinforced fabric and other layers); and curing the resulting stack, e.g., under vacuum or other pressure, to compress and bond the layers and form the resulting composite material incorporating the conductors. In various embodiments, a similar sequence of steps is followed, but with dry fabric (i.e. not prepreg) and a high pressure resin transfer molding (HP-RTM) process.

As illustrated by the example shown in FIG. 6, techniques disclosed herein may enable multiple pairs of connections to be run through the composite material comprising a aircraft or other vehicle structures, such as a wing, a boom, or a fuselage. In various embodiments, techniques disclosed herein enable conductors in which current flows in opposite directions to be run near one another, such as the conductors connecting the positive and negative terminals, respectively, of a battery to a remote motor, which results in the magnetic fields associated with such current flows tending to cancel each other out, thereby reducing the electromagnetic interference (EMI) effect of such current flows.

In various embodiments, any one or more techniques compatible with composite structure fabrication may be used to form and shape conductors included in composite materials as disclosed herein. In some embodiments, conductive via structures may be formed to provide electrical connection between conductors in different layers in a composite stack. In various embodiments, electrical connections between conductors comprising a composite may be made using conductive via structures or other techniques, to form electrical connections between conductors to provide a desired circuit.

Incorporating one or more conductors in a composite material and structure, as disclosed herein, in various embodiments may provide a relatively lightweight way to form electrical circuits and make electrical connections, including but not limited to connecting a centrally-located battery to one or more remote electrical motors in an electric-powered aircraft or other vehicle.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A composite structure coupled to an aircraft fuselage, comprising: a wing structure including:
   an airfoil having a leading edge extending from a base to a distal end;
   a plurality of booms, each boom extending from the airfoil in a direction transverse to the leading edge and extending to a distal portion configured to support a lift fan;
   a plurality of conductors provided in the wing structure and extending from the base to each of the plurality of the booms, wherein the plurality of conductors connect a centrally-located battery to the lift fans to provide electrical power to the lift fans; and a plurality of laminated layers forming the wing structure and including:
   a first insulating layer adjacent to and in contact with a first side of each conductor of the plurality of conductors;
   a second insulating layer adjacent to and in contact with a second side of each conductor of the plurality of conductors; and
   two or more exterior layers of fiber reinforced composite material that sandwich each conductor of the plurality of conductors and the first and second insulating layers therebetween;
   wherein a first subset of the plurality of booms are attached to the airfoil at a non-zero angle relative to a substantially vertical axis of the aircraft fuselage such that each boom of the first subset is tilted inboard towards the fuselage; and
   wherein a second subset of the plurality of booms are attached to the airfoil at a non-zero angle relative to the substantially vertical axis of the aircraft fuselage such that each boom of the second subset is tilted outboard away from the fuselage.

2. The composite structure of claim 1, wherein each conductor of the plurality of conductors comprises aluminum.

3. The composite structure of claim 1, wherein each of the plurality of conductors comprises a conductive structure stamped or otherwise formed from an aluminum sheet material.

4. The composite structure of claim 3, wherein the aluminum sheet material comprises 0.020 inch thick aluminum sheet material.

5. The composite structure of claim 3, wherein the conductive structure is between 0.002 inches thick and 0.050 inches thick.

6. The composite structure of claim 1, wherein each conductor of the plurality of conductors comprises a relatively flat or flattened metal having a width an order of magnitude or more greater than its thickness.

7. The composite structure of claim 1, wherein each conductor of the plurality of conductors are positioned within the composite structure at a location near an outer surface of the composite structure.

8. The composite structure of claim 1, wherein each of the first and second insulating layers comprise two or more layers of fiberglass.

9. The composite structure of claim 1, wherein the first and second insulating layers are bonded to the plurality of conductors in a first region of the composite structure in which the plurality of conductors are located and to one another in a second region of the composite structure in which the plurality of conductors are not present.

10. The composite structure of claim 1, wherein the plurality of conductors comprises a first conductor and a second conductor, the second conductor insulated electrically from the first conductor by the first insulating layer.

11. The composite structure of claim 10, wherein the first conductor and the second conductor comprise substantially parallel conductive paths.

12. The composite structure of claim 11, wherein the first conductor and the second conductor carry current flowing in opposite directions.

13. The composite structure of claim 10, wherein the first conductor and the second conductor are arranged side by side in substantially a same layer of the composite structure.

14. The composite structure of claim 10, wherein the first conductor of the plurality of conductors is located in a first layer of the composite structure and the second conductor of the plurality of conductors is located in a second layer of the composite structure in a location substantially aligned with the first conductor.

15. The composite structure of claim 1, wherein each conductor of the plurality of conductors is adapted to carry current of at least 50 amps.

16. The composite structure of claim 1, wherein each conductor of the plurality of conductors is adapted to carry steady current.

17. The composite structure of claim 1, wherein each conductor of the plurality of conductors wraps around the leading edge of the airfoil to terminate at a tab on an underside of the airfoil.

18. A process to fabricate a composite structure for an aircraft, comprising:
   arranging one or more layers of fiber reinforced composite precursor material in a tool having a shape associated with an airfoil having a leading edge extending from a base to a distal end;
   forming a first insulating layer by placing one or more layers of electrically insulating material adjacent to at least a portion of a topmost layer of fiber reinforced composite precursor material;
   positioning a plurality of conductors on the first insulating layer, wherein the plurality of conductors extend from the base of the airfoil to the distal portion of each of the plurality of booms to electrically couple a centrally-located battery to lift fans attached to the distal portion of each of the plurality of booms;
   forming a second insulating layer on top of the plurality of conductors;
   adding one or more additional layers of fiber reinforced composite material on top of the second insulating layer; and
   curing the first and second insulating layers, the topmost layer and the one or more additional layers to form the airfoil; and
   attaching a plurality of booms to the airfoil, each boom extending transverse to the leading edge to a distal portion configured to support a lift fan, wherein a first subset of the plurality of booms are attached to the airfoil at a non-zero angle relative to a substantially vertical axis of a fuselage of the aircraft such that each boom of the first subset is tilted inboard towards the fuselage, and wherein a second subset of the plurality of booms are attached to the airfoil at a non-zero angle relative to the substantially vertical axis of the aircraft such that each boom of the second subset is tilted outboard away from the fuselage.

19. The process of claim 18, wherein the plurality of conductors are conformed to a shape associated with the tool.

\* \* \* \* \*